United States Patent [19]

Hornschu et al.

[11] 4,030,808
[45] June 21, 1977

[54] BINOCULAR TELESCOPE
[75] Inventors: Joachim Hornschu, Oberkochen; Arthur Jung, Konigsbronn, Brenz, both of, Germany
[73] Assignee: Carl Zeiss-Stiftung, Oberkochen, Germany
[22] Filed: Oct. 7, 1975
[21] Appl. No.: 620,392
[30] Foreign Application Priority Data
Oct. 19, 1974 Germany .................... 7435008[U]
[52] U.S. Cl. .................................. 350/36; 350/41; 350/42; 350/44; 350/47; 350/76
[51] Int. Cl.² ........................................ G02B 21/20
[58] Field of Search ................... 350/36, 41, 42, 44, 350/43, 76, 77, 255
[56] References Cited
FOREIGN PATENTS OR APPLICATIONS
2,316,955 10/1974 Germany ............................ 350/76

Primary Examiner—John K. Corbin
Assistant Examiner—Matthew W. Koren
Attorney, Agent, or Firm—Hopgood, Calimafde, Kalil, Blaustein & Lieberman

[57] ABSTRACT

The invention contemplates binocular-telescope construction wherein a central bridge establishes spaced parallel pivot axes for separate articulation of the respective telescopes with respect to each other. Focusing-adjustment means carried by the bridge is operative upon corresponding movable optical elements of the respective telescopes, regardless of the articulated position of either or both of the telescopes with respect to the bridge. The chain of connection between adjustment at the bridge and optical-element positioning involves a longitudinally guided movable element near each articulation axis, and an end of the element contacts a flat surface associated with the mount for the optical element, such surface being in a plane normal to the longitudinal guide axis of movable element.

11 Claims, 7 Drawing Figures

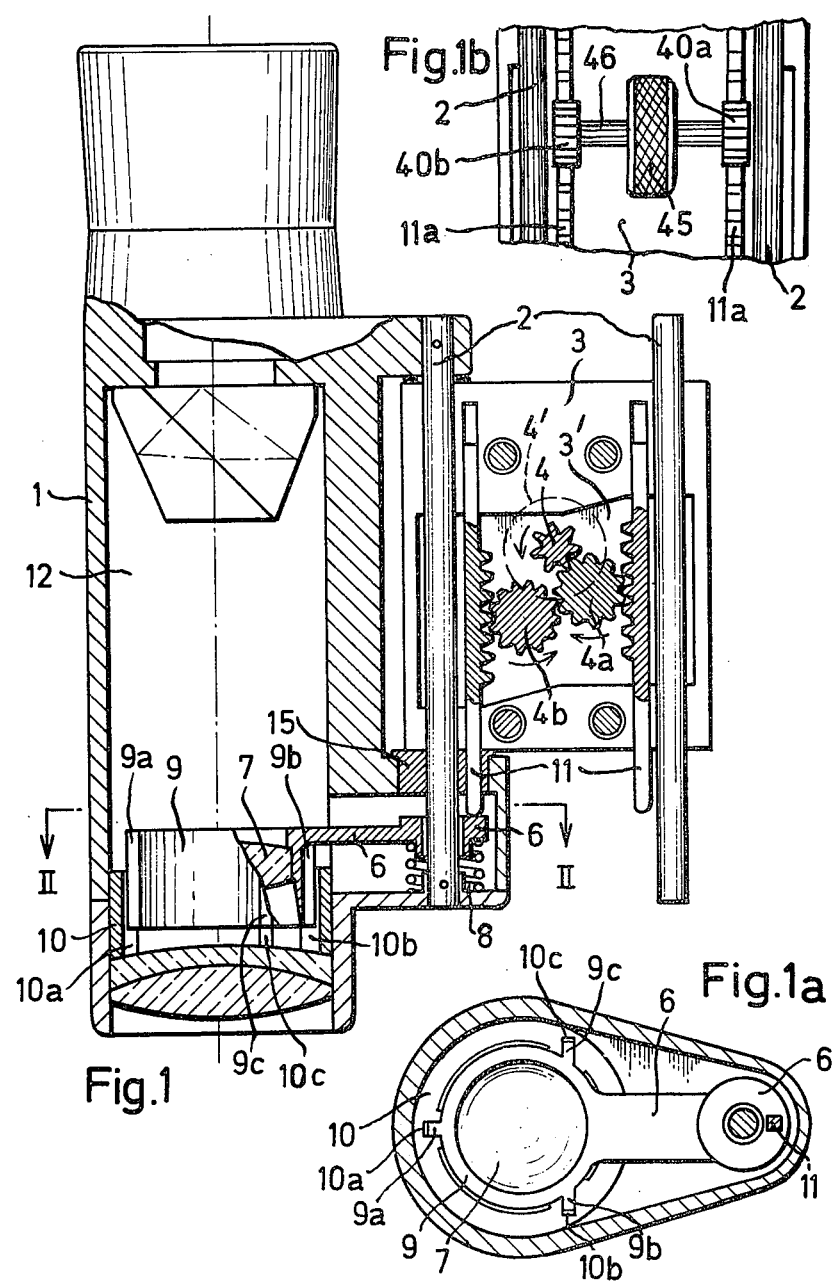

BINOCULAR TELESCOPE

The invention relates to a binocular-telescope construction having a double-hinged connecting bridge between the individual telescopes for selective establishment of a condition of use or of compact folding for storage. In particular, the invention relates to the focusing of both telescopes, in common, wherein the focusing optical element and its movable support are contained with the barrel of each telescope and are adjustably positionable by means of a single drive element carried by the connecting bridge.

Double-hinged bridge-connected binocular telescopes offer great flexibility in adjustment for use and for folding; they take up very little space in the folded position. This permits more convenient use of telescopes as well as new possibilities of use.

Binocular telescopes of the character indicated, and with common focusing of the two individual telescopes, are disclosed in German Provisional Patent No. 2,233,055. In such binoculars, the optical parts which serve for focusing are surrounded by a support which is axially displaceable within the barrel by means of an externally mounted drive element; each support includes an offset arm extending to the associated bridge-pivot axis, where such axis is utilized for a first guide for axial displacement, while another guide element coacts between the telescope housing and the support to maintain axial orientation of the movable optical elements with respect to the optical axis.

It is an object of the present invention to provide improved binocular telescopes of the character indicated.

Another object is to achieve the foregoing object with simple, reliable and less critically related parts than in past constructions.

A specific object is to achieve the above objects using a spring-loaded rod-to-shoulder abutment in the chain of controlled axial adjustment for each movable optical element, the shoulder being normal to the hinge axis and to the optical axes so that axial adjustment may be independent of the hinged relation of either telescope to the bridge.

In one advantageous embodiment of the invention, each focusing lens is contained in a mount provided with an offset shoulder piece and with grooves, the grooves engaging into corresponding guide slots of guide means in the barrel for non-rotatable guidance of the mount in its barrel; and a bridge-mounted gear is provided as the adjustment drive element, said gear engaging in two further gears each of which engages an axially displaceable rack which serves for transmission of the adjustment and which transmits its longitudinal movement to the shoulder piece of the mount. Another embodiment of the invention is characterized by the fact that each barrel tube is developed on its interior as a V-bearing, for guided support of the focusing-lens mount and that, on the bridge, an axially movable drive element effects, via a transverse connecting part, longitudinal movement of a transmission element which acts on the focusing-lens mount.

The embodiments of the invention can furthermore be varied, for example, by guiding the axially movable transmission element (which acts on the support) in a hollow shaft, or for example, by using rocker-arm techniques for the transverse connection in the bridge.

The advantages obtained with the invention reside in the robustness and precision obtainable despite the smallness of the binoculars, thus permitting an elegant and harmonious external appearance.

Various examples of the invention are shown in the drawing and will be described in further detail below. In the drawings:

FIG. 1 is a fragmentary view in elevation, partly brokenaway and in longitudinal section, through a binocular telescope in accordance with one form of the invention;

FIG. 1a is a section along the line II—II of the binoculars shown in FIG. 1;

FIG. 1b is a view of a modified drive device, for the binoculars shown in FIG. 1;

Figure 2A:
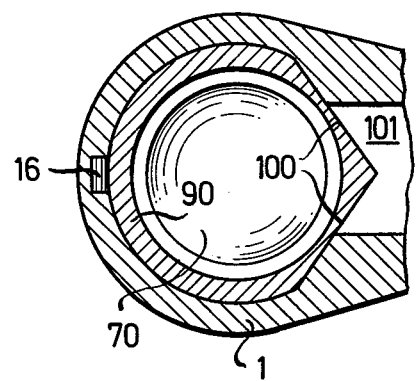
FIG. 2a is a simplified sectional view taken at III—III of FIG. 2.

In all embodiments of the binocular invention shown in the drawings, each telescope housing is identified 1. Each of two spaced parallel hinge-pivot pins is identified 2, and it connects one end of a bridge 3 to the adjacent binocular housing 1; the tubular part of the binocular housing is termed the barrel 12. Since the left and right halves of the binoculars are identical, only one telescope is shown with the connecting bridge for each of the embodiments.

In the embodiment of FIG. 1, a lens 7 serves for the focusing and is contained in a mount 9, provided with grooves 9a–9b–9c. The grooves 9a–9b–9c engage in corresponding guide slots 10a–10b–10c of a guide element or insert 10, arranged in the barrel 12 for non-rotatable axial guidance of the mount 9. Within a cavity 3' defined by and between opposed bridge halves 3, a drive gear 4 is mounted, under rotational control by an external adjustment knob 4'; gear 4 drives two spaced meshing pinions 4a–4b, each of which in turn drives one of two axially movable racks 11. Both ends of each rack 11 are longitudinally guided by groove formations in the bridge means 3, and the lower end of each rack 11 slidably passes through an offset opening in a bushing 15 which is centered on the adjacent pivot pin 2 and which is rotatable in an enlarged opening in the associated telescope housing 1; the projecting lower end of each rack abuts the flat transverse upper surface of a shoulder piece 6 of the mount 9 to axially displace the latter. The shoulder piece 6 is held in its instantaneous position by the constant urging of a preload spring 8. The rotatable mounting of bushing 15 in housing 1 enables rotary adjustment of barrel 12 about the pivot-pin axis 2, as when opening or folding the instrument, all without loss of focusing-element adjustment, as will be understood.

In FIG. 1b, a knurled control knob 45 is bridge-mounted for rotation on an axis perpendicular to the axial direction of focusing-element adjustment, and knob 45 drives like pinions 40a and 40b via the shaft 46. Pinions 40a and 40b engage in longitudinally guided racks 11a which in their turn, as in the example shown in FIG. 1, will be understood to act on the shoulder piece of the support for the displaceable optical elements, to thus effect focusing.

Figure 2:
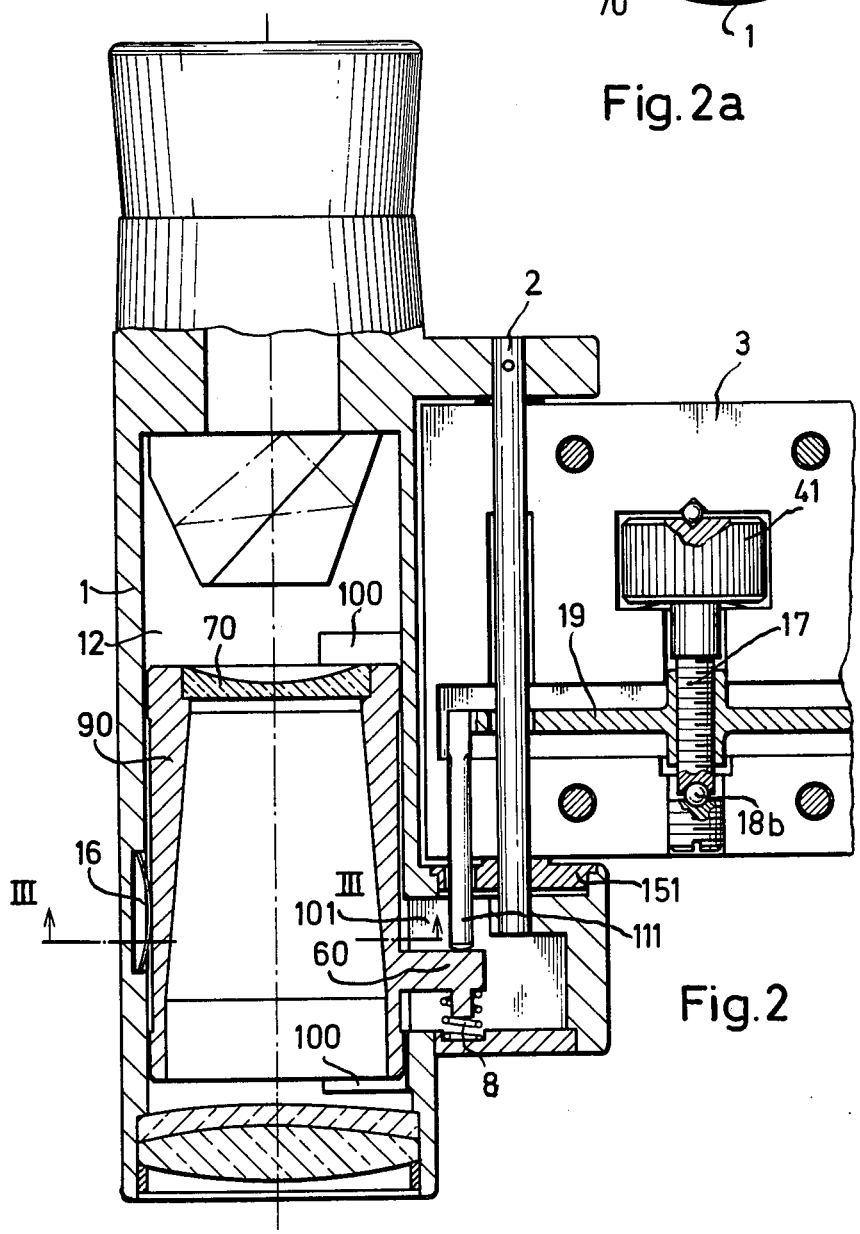
FIGS. 2, 3 and 4 are views similar to FIG. 1 to show other embodiments.

In the embodiment of FIGS. 2 and 2a, the inside of the barrel 12 is developed as adjacent elongate flats of a V-bearing, at 100. The focusing lens 70 is held in a support 90, having matching flats to ride bearing 100. The housing 1 is provided at 101 with a radially offset cavity to accommodate the shoulder piece 60 of support 90. A preloading spring 16 holds support 90 in its position in the V-bearing, with lens 70 on the axis of the barrel tube. For a focusing adjustment, a bridge-mounted drive knob 41 is actuated to turn a lead screw 17, thus moving the threaded hub of a transverse connecting part 19, and, via the latter, an axially guided transmission element 111. The transmission element 111 acts on shoulder piece 60 of support 90, to axially displace the lens 70. A rotary bushing 151 permits the rotation of the telescope around the axis, in the manner already described at 15 in FIG. 1.

Figure 3:
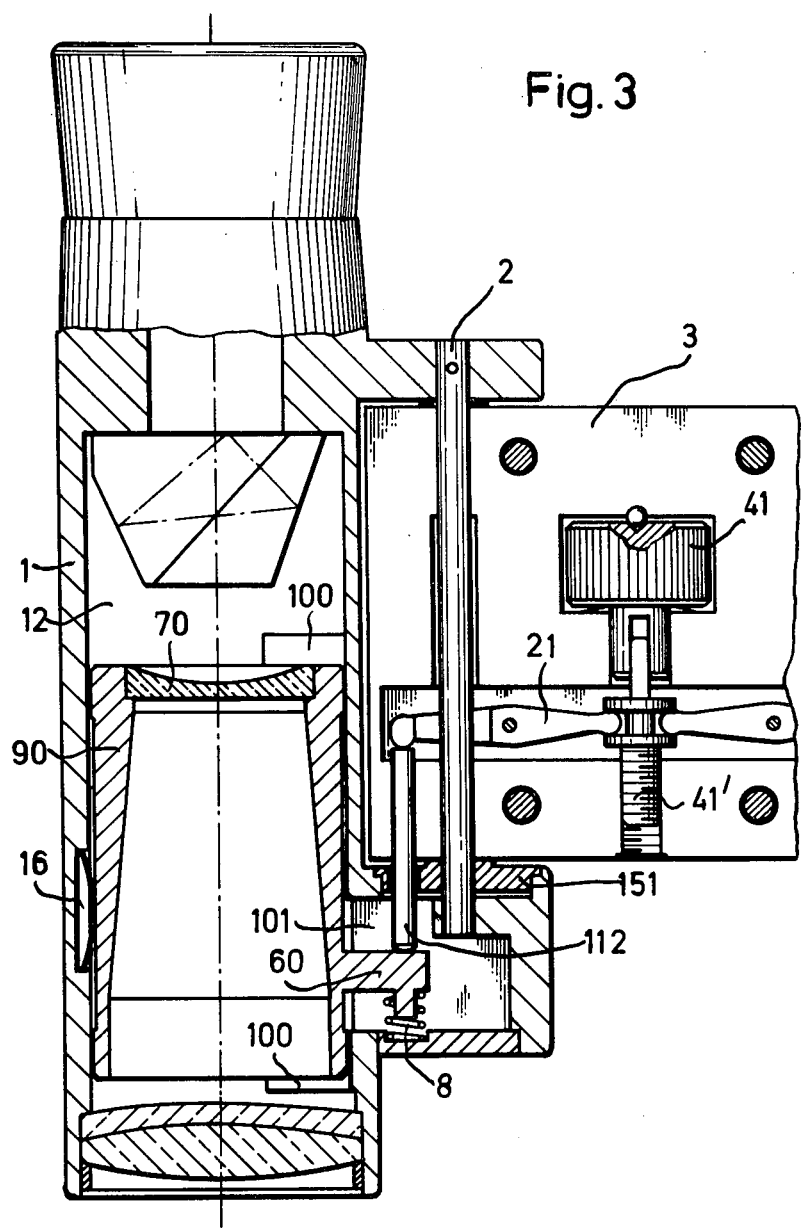

In the embodiment of FIG. 3, a rotary movement of a bridge-mounted drive knob 41 imparts axial motion to radial flanges of a screw 41' having threaded engagement to bridge structure 3, and this axial motion is transmitted via rocker-arm means 21 to a transmission element 112, whereby the shoulder piece 60 of support 90, and thus the lens 70, are moved longitudinally.

Figure 4:
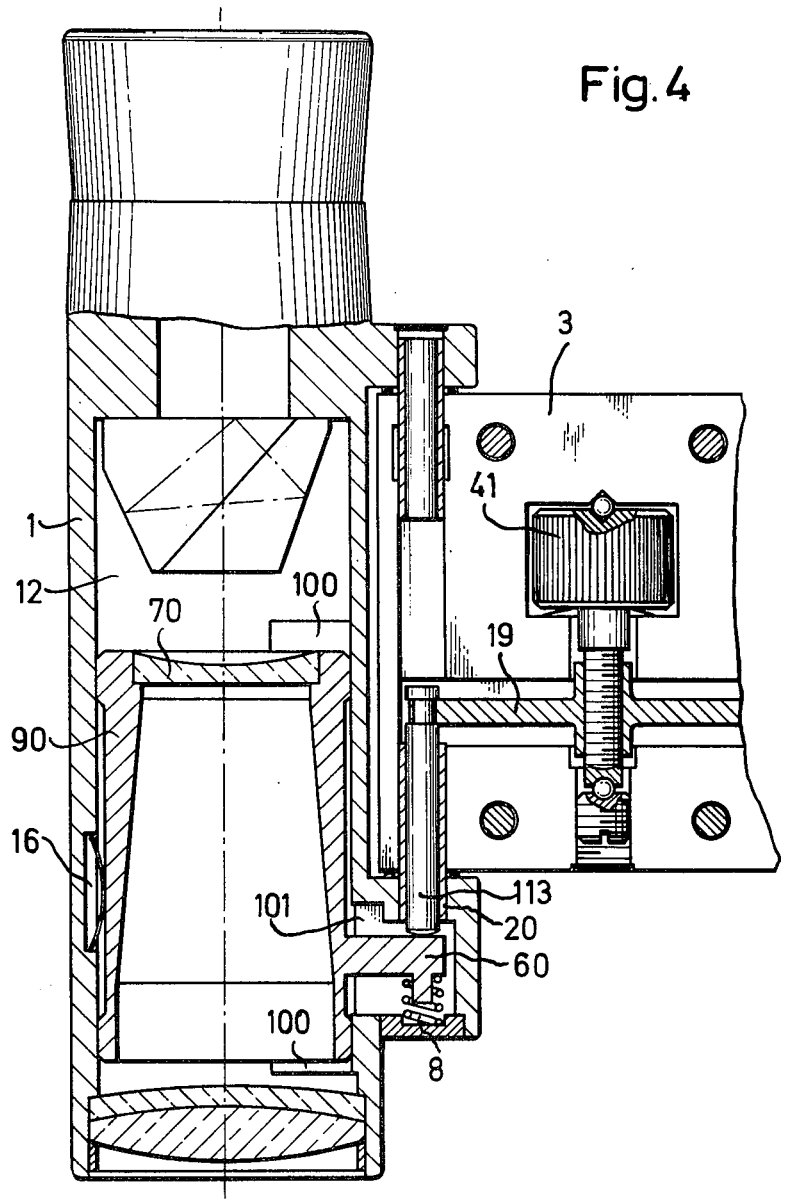

In the embodiment of FIG. 4, the pivot pins 2 of previous embodiments are each replaced by a hollow shaft 20, and a transmission rod element 113 is guided for axial motion within shaft 20, for positioning abutment with the shoulder piece 60. The other functional parts of FIG. 5 correspond to those of FIG. 3.

What is claimed is:

1. A binocular telescope, comprising two telescopes each of which has its own housing with an offset arm for hinge mounting, a bridge having spaced parallel hinge elements independently connected to the respective hinge mountings of said housings, each telescope comprising its optical system including an axially movably guided focusing lens element and mount, said mount including an offset arm with a flat shoulder surface that is normal to the axis of lens-mount guidance, drive means including a manual actuator carried by said bridge, a separate elongate transmission element carried and longitudinally guided by said bridge adjacent each hinge element connection, the guide axis for each transmission element being parallel to said hinge axes and to said optical systems, said drive means having an axially displacing actuating connection to each transmission element, and spring means carried by each housing and preloading each mount for shoulder-surface abutment with an end of the associated transmission element.

2. The binocular telescope of claim 1, in which each lens mount and its associated housing have interengaged elongate groove and key formations holding each mount and its housing against relative rotation.

3. The binocular telescope of claim 1, in which said drive element includes a gear, and means including a separate rack-and-pinion coupling of said gear to each said transmission element.

4. The binocular telescope of claim 1, in which said drive element is a knob on a drive shaft mounted for rotation on an axis extending in the span direction of said bridge, and means including a separate rack-and-pinion coupling said shaft to each said transmission element.

5. The binocular telescope of claim 1, in which the guide axis of each transmission element is offset from the adjacent hinge connection axis, and wherein the adjacent housing offset arm includes a rotary bushing journalled therein on the hinge-pivot axis, the radius of said bushing exceeding the offset of the transmission-element guide axis and having a locally offset opening which axially movably accommodates said transmission element.

6. The binocular telescope of claim 1, in which the said hinge elements are hollow shafts, and in which the transmission elements are rods axially guided by said shafts.

7. In a binocular telescope, two telescopes each of which has its own housing with an offset arm for hinge mounting, a bridge having spaced parallel hinge elements independently connected to the respective hinge mountings of said housings, each telescope comprising its optical system including an axially movably guided focusing lens element and mount, and a single manually operable control element carried by said bridge for concurrent focusing adjustment of said mounts, the improvement which comprises a shoulder on each said mount and having a flat shoulder surface that is normal to the axis of lens-mount guidance, and a movable transmission element carried and longitudinally guided by said bridge in the region of each hinge axis, each transmission element being in position-controlling end abutment with the adjacent shoulder surface and having an axially positioning drive connection to said control element, and spring means preloading each mount for said shoulder-surface abutment.

8. The binocular telescope of claim 7, in which said axially positioning drive connection to said control element includes an axially movable part which extends transversely over the effective span of said bridge.

9. The binocular telescope of claim 7, in which said axially positioning drive connection to said control element includes a rocker-arm connection from said control element to each transmission element.

10. A binocular telescope, comprising two telescopes each of which has its own housing with an offset arm for hinge mounting, a bridge having spaced parallel hinge elements independently connected to the respective hinge mountings of said housings, each telescope comprising its optical system including an axially movably guided focusing lens element and mount, said mount including an offset arm with a flat shoulder surface that is normal to the axis of lens-mount guidance, drive means including a manual actuator carried by said bridge, one of said hinge elements at each housing-to-bridge connection including a pin that is slidably guided on the hinge axis, said drive means having an axially displacing actuating connection to each of said pins, and spring means preloading each mount for shoulder-surface abutment with an end of the associated one of said pins.

11. A binocular telescope, comprising two telescopes each of which has its own elongate tubular housing with an offset arm for hinge mounting, a bridge having spaced parallel hinge elements independently connected to the respective hinge mountings of said housings, each telescope comprising its optical system including an axially movably guided focusing lens element and mount; each said mount and the adjacent wall of the tubular region having coacting elongate V-bearing formations at one angular locale of the tubular wall, and spring means reacting between said housing and mount at a locale generally diametrically opposite said V-bearing locale for resiliently loading the engagement of said V-bearing formations; each said mount further including an offset arm with a flat shoulder surface that is normal to the axis of lens-mount guidance, drive means including a manual actuator carried by said bridge, a separate elongate transmission element guided by said bridge adjacent each hinge element connection, the guide axis for each transmission element being parallel to said hinge axes and to said optical systems, said drive means having an axially displacing actuating connection to each transmission element, and spring means preloading each mount for shoulder-surface abutment with an end of the associated transmission element.

* * * * *